(12) United States Patent
Shin et al.

(10) Patent No.: US 12,512,541 B2
(45) Date of Patent: Dec. 30, 2025

(54) INSULATION MEMBER, METHOD OF MANUFACTURING THE INSULATION MEMBER, AND METHOD OF MANUFACTURING CYLINDRICAL BATTERY COMPRISING THE INSULATION MEMBER

(71) Applicant: LG Chem, Ltd., Seoul (KR)

(72) Inventors: Hang Soo Shin, Daejeon (KR); Do Gyun Kim, Daejeon (KR); Sang Sok Jung, Daejeon (KR); Byoung Kook Lee, Daejeon (KR); Byoung Gu Lee, Daejeon (KR); Chan Bae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 540 days.

(21) Appl. No.: 16/490,254

(22) PCT Filed: Apr. 24, 2018

(86) PCT No.: PCT/KR2018/004761
§ 371 (c)(1),
(2) Date: Aug. 30, 2019

(87) PCT Pub. No.: WO2018/199604
PCT Pub. Date: Nov. 1, 2018

(65) Prior Publication Data
US 2020/0013998 A1      Jan. 9, 2020

(30) Foreign Application Priority Data

Apr. 27, 2017   (KR) .................. 10-2017-0054247
Apr. 24, 2018   (KR) .................. 10-2018-0047588

(51) Int. Cl.
*H01M 10/04*   (2006.01)
*H01M 2/06*    (2006.01)
(Continued)

(52) U.S. Cl.
CPC ..... *H01M 50/186* (2021.01); *H01M 10/0422* (2013.01); *H01M 50/107* (2021.01); *H01M 50/179* (2021.01); *H01M 50/191* (2021.01)

(58) Field of Classification Search
CPC ............. H01M 50/184; H01M 50/186; H01M 50/193; H01M 50/195; H01M 50/197;
(Continued)

(56) References Cited

U.S. PATENT DOCUMENTS 3,364,059 A  *  1/1968  Marzocchi .............. C03C 25/40
                                                         427/389.7
2007/0083004 A1    4/2007  Shooshtari et al.
(Continued)

FOREIGN PATENT DOCUMENTS

CN     102686053 A     9/2012
CN     103765654 A     4/2014
(Continued)

OTHER PUBLICATIONS

Lee; KR 20070078860 A; EPO Patent Translate; Machine Translation (Year: 2007).*
(Continued)

*Primary Examiner* — Allison Bourke
*Assistant Examiner* — Charlene Bermudez
(74) *Attorney, Agent, or Firm* — Lerner David LLP

(57) ABSTRACT

Disclosed herein are an insulation member, a method of manufacturing the insulation member, and a method of manufacturing a cylindrical battery including the insulation member, and more particularly an insulation member including an insulation plate substrate configured as a reticular structure formed by glass fiber strands and a binder applied to the insulation plate substrate, a method of manufacturing the insulation member, and a method of manufacturing a cylindrical battery including the insulation member.

8 Claims, 13 Drawing Sheets

(51) Int. Cl.
*H01M 50/107* (2021.01)
*H01M 50/179* (2021.01)
*H01M 50/186* (2021.01)
*H01M 50/191* (2021.01)

(58) Field of Classification Search
CPC ............ H01M 50/107; H01M 50/148; H01M 10/0422; H01M 50/152; H01M 50/411; H01M 50/431; H01M 50/42; H01M 50/437; H01M 50/44; H01M 50/446; H01M 50/449; H01M 50/454; H01M 50/469; H01M 10/06; H01M 10/123; H01M 50/474; H01M 50/48; H01M 50/471; H01M 50/46; H01M 50/489; H01M 10/02; H01M 10/0431; H01M 10/0525; H01M 10/052; H01M 10/054; H01M 10/058; H01M 10/0587; H01M 10/286; H01M 50/409; D04H 1/593; D04H 1/4218; D04H 1/4374; D04H 13/00; D04H 3/14; D04H 1/4358; D04H 1/587; D04H 1/62; D04H 1/64; D04H 3/007; D04H 3/004; D04H 3/016; D04H 3/12; D04H 3/115; D04H 3/163; D04H 5/12; D04H 13/008; D04H 13/006
See application file for complete search history.

(56) References Cited

U.S. PATENT DOCUMENTS

| | | | | |
|---|---|---|---|---|
| 2007/0154789 | A1* | 7/2007 | Chang | H01M 10/0587 429/185 |
| 2009/0111003 | A1* | 4/2009 | Kim | H01M 50/171 429/53 |
| 2012/0205039 | A1 | 8/2012 | Yamada et al. | |
| 2014/0141312 | A1* | 5/2014 | Kim | H01M 50/429 429/144 |
| 2014/0178725 | A1 | 6/2014 | Kim et al. | |
| 2014/0220394 | A1 | 8/2014 | Kim et al. | |
| 2016/0079581 | A1* | 3/2016 | Ashirgade | H01M 50/463 429/246 |
| 2016/0093931 | A1 | 3/2016 | Rawlinson et al. | |

FOREIGN PATENT DOCUMENTS

| | | | |
|---|---|---|---|
| CN | 204946974 U | 1/2016 | |
| CN | 205104554 U | 3/2016 | |
| DE | 102012214964 A1 * | 3/2014 | ......... H01M 2/0267 |
| GB | 2148346 A | 5/1985 | |
| JP | S62231746 A | 10/1987 | |
| JP | H0551873 A | 3/1993 | |
| JP | H09120804 A | 5/1997 | |
| JP | H10255861 A | 9/1998 | |
| JP | H11144529 A | 5/1999 | |
| JP | 2000348771 A | 12/2000 | |
| JP | 2001210384 A | 8/2001 | |
| JP | 2001323646 A | 11/2001 | |
| JP | 2002088626 A | 3/2002 | |
| JP | 2002231314 A | 8/2002 | |
| JP | 3686368 B2 | 8/2005 | |
| JP | 2008027635 A | 2/2008 | |
| JP | 4200589 B2 | 12/2008 | |
| KR | 100719729 B1 | 5/2007 | |
| KR | 20070078860 A * | 8/2007 | |
| KR | 101154882 B1 | 6/2012 | |
| KR | 20130004075 A | 1/2013 | |
| KR | 101558953 B1 | 10/2015 | |
| WO | WO-2013054936 A1 * | 4/2013 | ............ B32B 5/022 |

OTHER PUBLICATIONS

Lee et al; "KR20070078860A Secondary Battery", EPO Patent Translate Machine Translation (Year: 2007).*
Gless; "Description DE102012214964A1"; EPO Patent Translate Machine Translation (Year: 2012).*
Gless; "Description DE102012214964A1"; Machine translation of DE-102012214964-A1 obtained from ESpacenet Patent Translate (Year: 2014).*
Hirai et al; Porous Three-Layer Laminate Sheet and Method for Manufacturing Same, and Separator for Electricity Storage Element Comprising Three-Layer Laminate Sheet; Machine translation of WO-2013054936-A1 obtained from WIPO Patent Translate (Year: 2013).*
Landry, G. et al., "A new highly flexible flame retardant silicone rubber coated fiberglass sleeving", EIC 17th Electrical/Electronics Insulation Conference, IEEE, Sep. 30, 1985, pp. 86-92, XP032894514.
Supplementary European Search Report including Written Opinion for Application No. EP18791914 dated Feb. 27, 2020, 8 pages.
International Search Report for PCT/KR2018/004761 mailed Aug. 16, 2018.
Chinese Search Report for Application No. 201880005811.7 dated Oct. 20, 2021, 3 pages.

* cited by examiner

[FIG. 1]
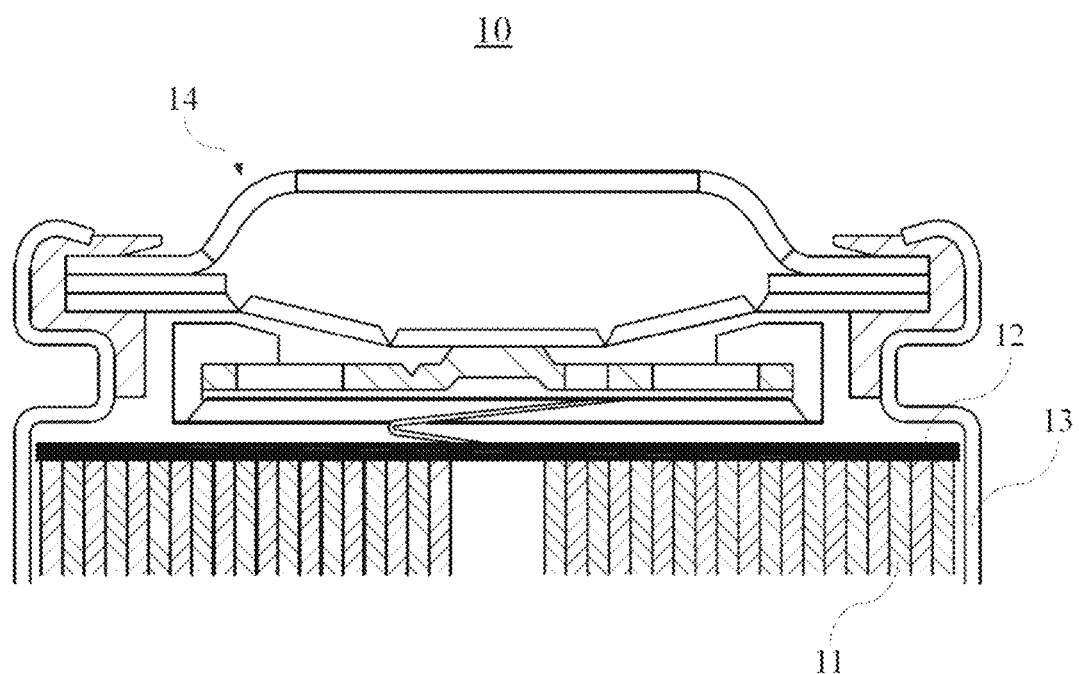

[FIG. 2]
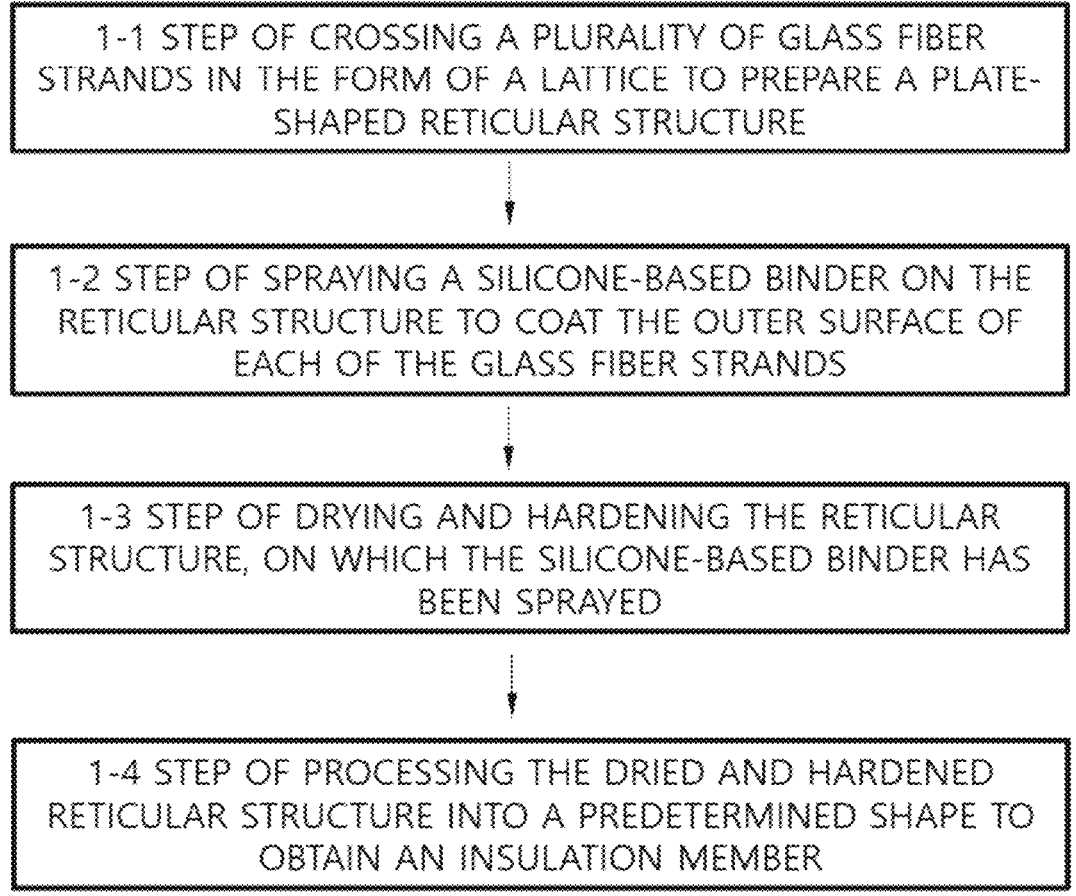

[FIG. 3]

```
2-1 STEP OF CROSSING A PLURALITY OF GLASS FIBER
STRANDS IN THE FORM OF A LATTICE TO PREPARE A PLATE-
SHAPED RETICULAR STRUCTURE
```
↓
```
2-2 STEP OF SPRAYING A URETHANE-BASED BINDER ON THE
RETICULAR STRUCTURE TO COAT THE OUTER SURFACE OF
EACH OF THE GLASS FIBER STRANDS
```
↓
```
2-3 STEP OF DRYING AND HARDENING THE RETICULAR
STRUCTURE, ON WHICH THE URETHANE-BASED BINDER HAS
BEEN SPRAYED
```
↓
```
2-4 STEP OF PROCESSING THE DRIED AND HARDENED
RETICULAR STRUCTURE INTO A PREDETERMINED SHAPE TO
OBTAIN AN INSULATION MEMBER
```

[FIG. 4]
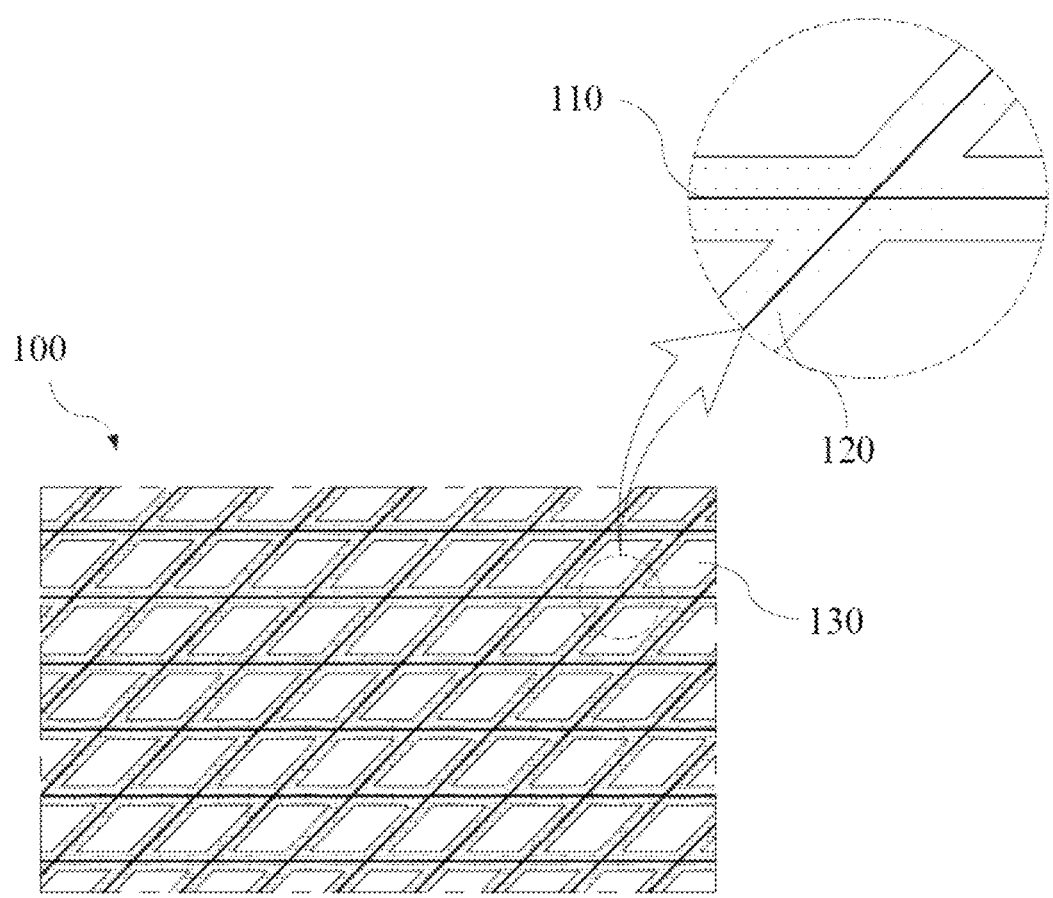

[FIG. 5]

```
3-1 STEP OF CROSSING A PLURALITY OF GLASS FIBER
STRANDS IN THE FORM OF A LATTICE TO PREPARE A PLATE-
SHAPED RETICULAR STRUCTURE
```

↓

```
3-2 STEP OF FILLING APERTURES FORMED IN THE
RETICULAR STRUCTURE WITH A SILICONE-BASED BINDER
```

↓

```
3-3 STEP OF DRYING AND HARDENING THE RETICULAR
STRUCTURE, WHICH HAS BEEN FILLED WITH THE SILICONE-
BASED BINDER
```

↓

```
3-4 STEP OF PROCESSING THE DRIED AND HARDENED
RETICULAR STRUCTURE INTO A PREDETERMINED SHAPE TO
OBTAIN AN INSULATION MEMBER
```

[FIG. 6]

```
┌─────────────────────────────────────────────────────────┐
│ 4-1 STEP OF CROSSING A PLURALITY OF GLASS FIBER         │
│ STRANDS IN THE FORM OF A LATTICE TO PREPARE A PLATE-    │
│           SHAPED RETICULAR STRUCTURE                    │
└─────────────────────────────────────────────────────────┘
                            │
                            ▼
┌─────────────────────────────────────────────────────────┐
│       4-2 STEP OF FILLING APERTURES FORMED IN THE       │
│   RETICULAR STRUCTURE WITH A URETHANE-BASED BINDER      │
└─────────────────────────────────────────────────────────┘
                            │
                            ▼
┌─────────────────────────────────────────────────────────┐
│   4-3 STEP OF DRYING AND HARDENING THE RETICULAR        │
│  STRUCTURE, WHICH HAS BEEN FILLED WITH THE URETHANE-    │
│                    BASED BINDER                         │
└─────────────────────────────────────────────────────────┘
                            │
                            ▼
┌─────────────────────────────────────────────────────────┐
│    4-4 STEP OF PROCESSING THE DRIED AND HARDENED        │
│  RETICULAR STRUCTURE INTO A PREDETERMINED SHAPE TO      │
│           OBTAIN AN INSULATION MEMBER                   │
└─────────────────────────────────────────────────────────┘
```

[FIG. 7]
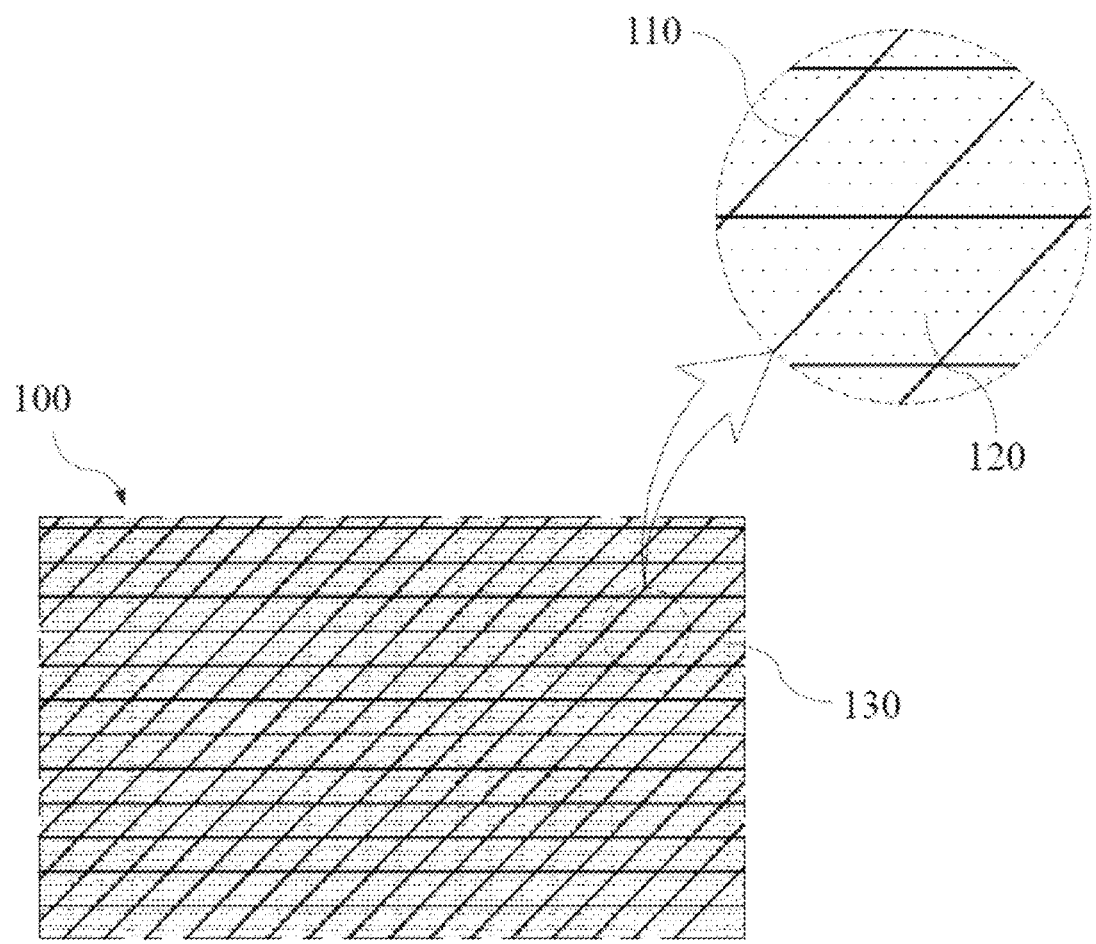

[FIG. 8]

```
┌─────────────────────────────────────────────────────────────┐
│ 5-1 STEP OF CROSSING A PLURALITY OF GLASS FIBER             │
│ STRANDS IN THE FORM OF A LATTICE TO PREPARE A PLATE-        │
│ SHAPED RETICULAR STRUCTURE                                  │
└─────────────────────────────────────────────────────────────┘
                            ↓
┌─────────────────────────────────────────────────────────────┐
│ 5-2 STEP OF SPRAYING A SILICONE-BASED BINDER ON THE         │
│ RETICULAR STRUCTURE TO COAT THE OUTER SURFACE OF            │
│ EACH OF THE GLASS FIBER STRANDS                             │
└─────────────────────────────────────────────────────────────┘
                            ↓
┌─────────────────────────────────────────────────────────────┐
│ 5-3 STEP OF DRYING AND HARDENING THE RETICULAR              │
│ STRUCTURE, ON WHICH THE SILICONE-BASED BINDER HAS           │
│ BEEN SPRAYED                                                │
└─────────────────────────────────────────────────────────────┘
                            ↓
┌─────────────────────────────────────────────────────────────┐
│ 5-4 STEP OF FILLING APERTURES FORMED IN THE                 │
│ RETICULAR STRUCTURE WITH A URETHANE-BASED BINDER            │
└─────────────────────────────────────────────────────────────┘
                            ↓
┌─────────────────────────────────────────────────────────────┐
│ 5-5 STEP OF DRYING AND HARDENING THE RETICULAR              │
│ STRUCTURE, WHICH HAS BEEN FILLED WITH THE URETHANE-         │
│ BASED BINDER                                                │
└─────────────────────────────────────────────────────────────┘
                            ↓
┌─────────────────────────────────────────────────────────────┐
│ 5-6 STEP OF PROCESSING THE DRIED AND HARDENED               │
│ RETICULAR STRUCTURE INTO A PREDETERMINED SHAPE TO           │
│ OBTAIN AN INSULATION MEMBER                                 │
└─────────────────────────────────────────────────────────────┘
```

[FIG. 9]
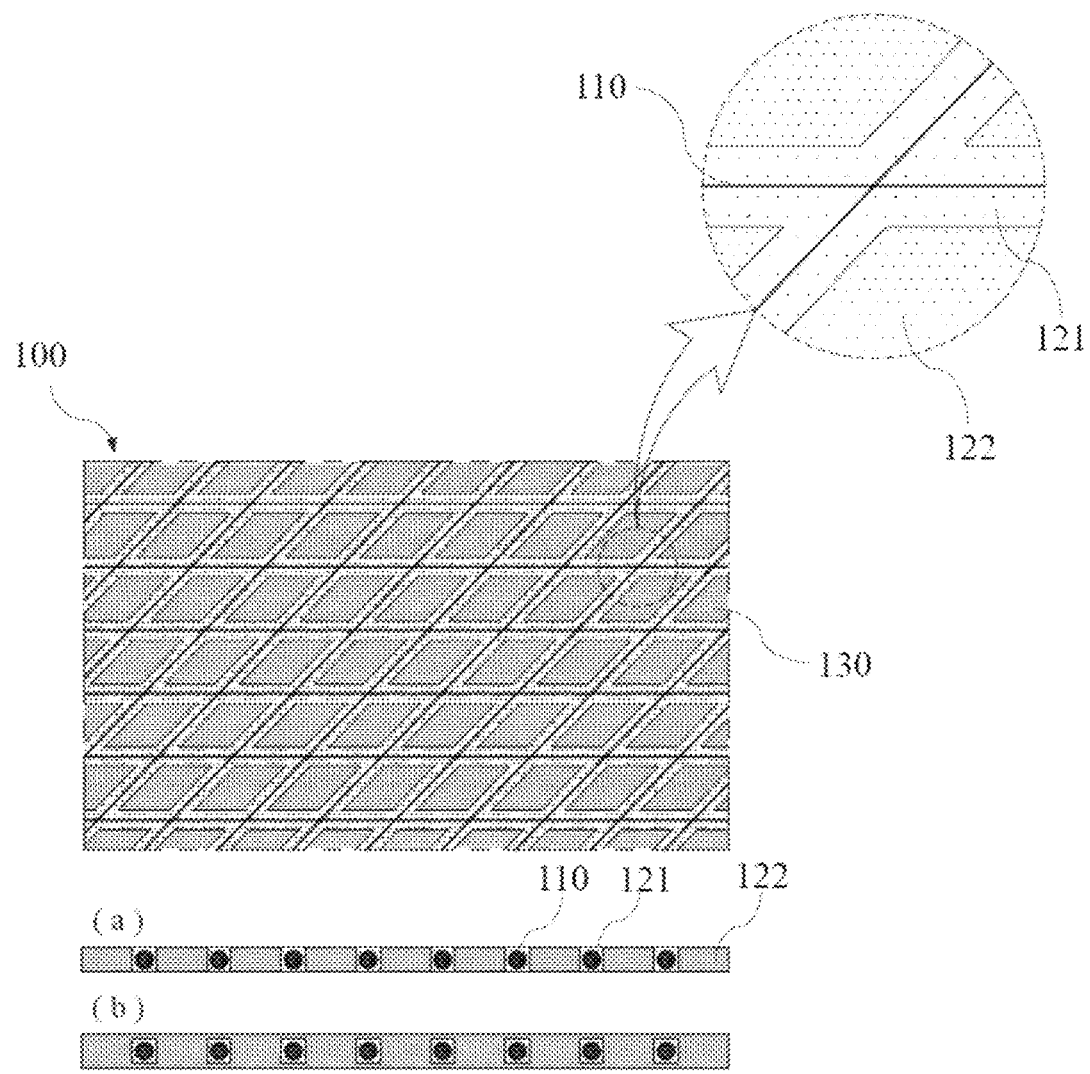

[FIG. 10]
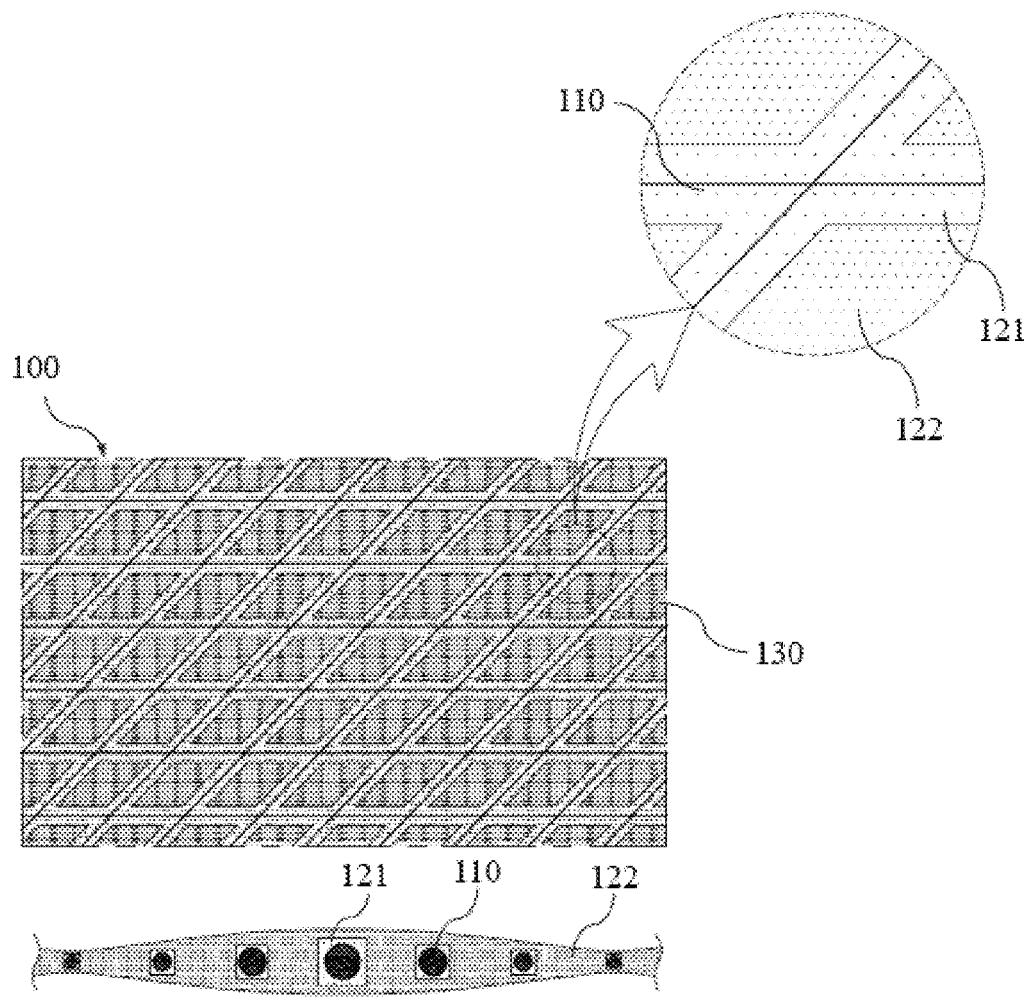

[FIG. 11]
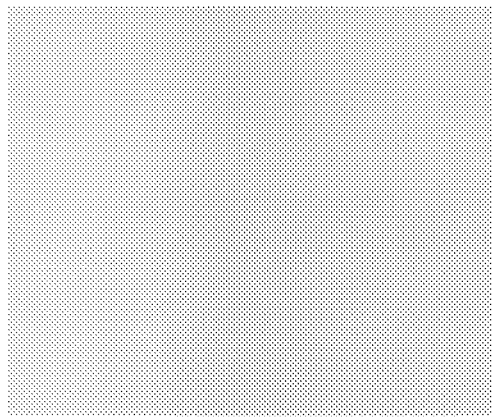 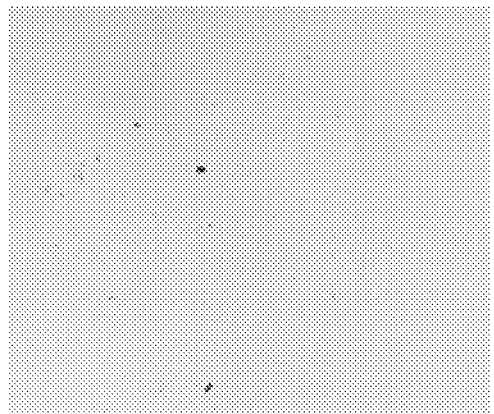
(a)                    (b)
[FIG. 12]
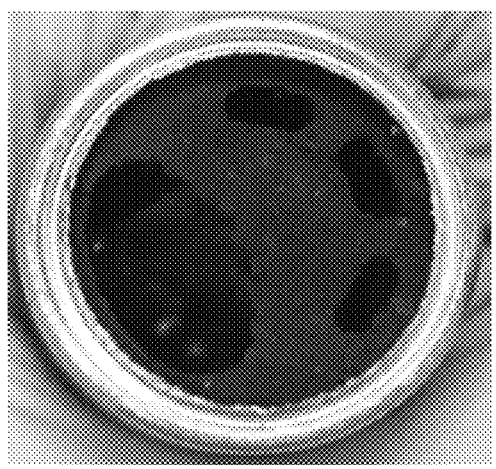 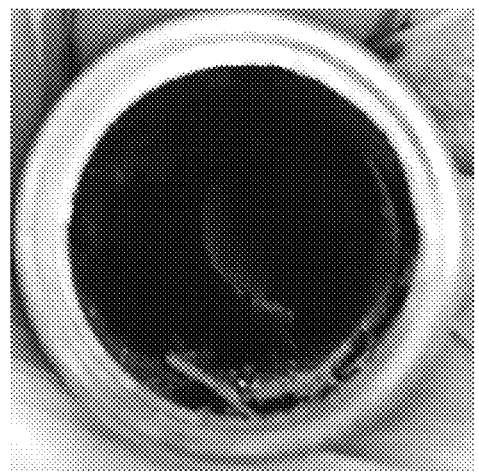
(a)                    (b)

[FIG. 13]
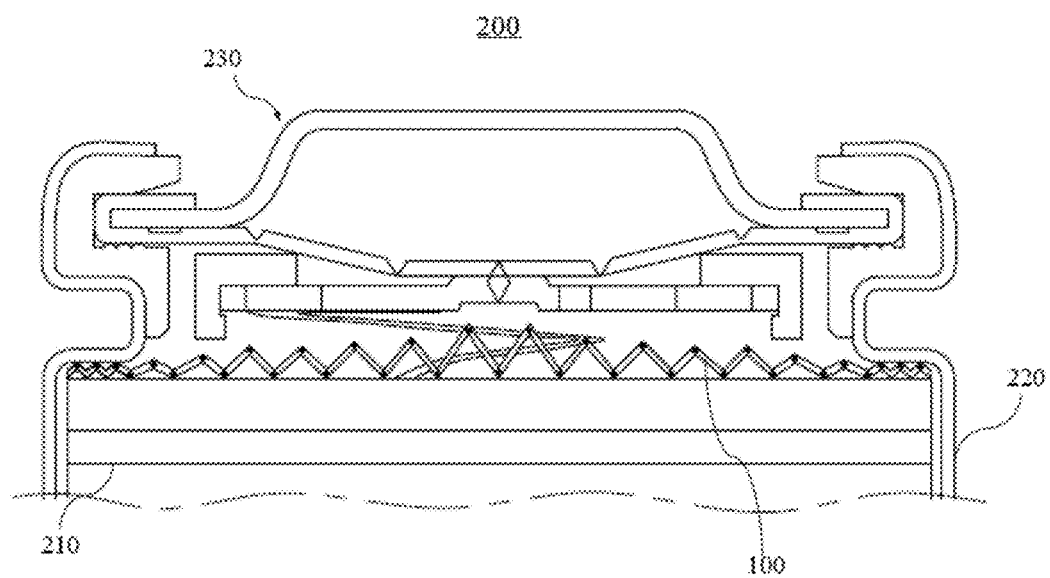
[FIG. 14]
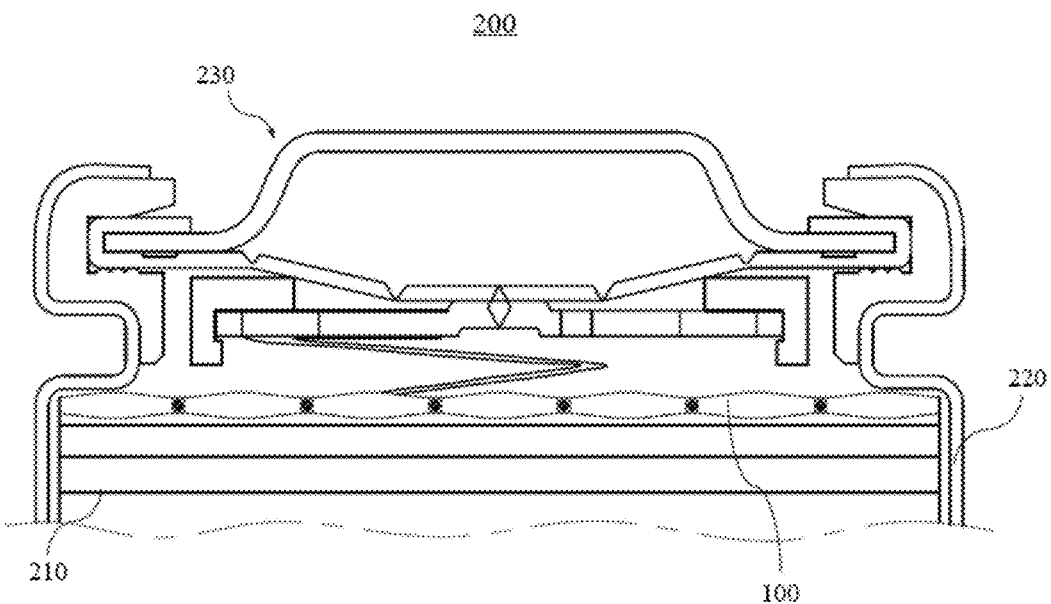

[FIG. 15]
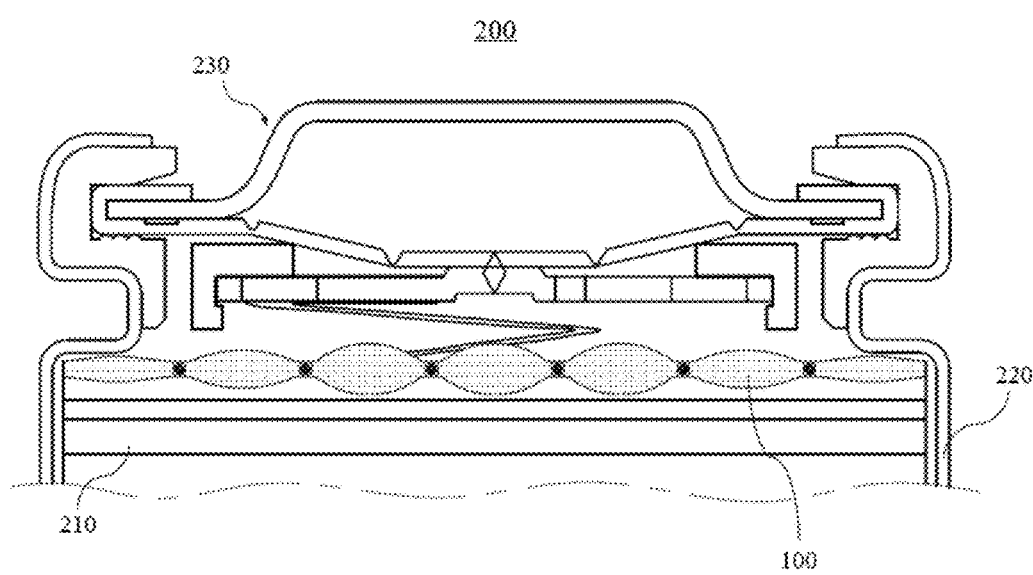

INSULATION MEMBER, METHOD OF MANUFACTURING THE INSULATION MEMBER, AND METHOD OF MANUFACTURING CYLINDRICAL BATTERY COMPRISING THE INSULATION MEMBER

CROSS-REFERENCE TO RELATED APPLICATIONS

This application is a national phase entry under 35 U.S.C. § 371 of International Application No. PCT/KR2018/004761, filed on Apr. 24, 2018, published in Korean, which claims priority from Korean Patent Application Nos. 10-2017-0054247 and 10-2018-0047588, filed on Apr. 27, 2017 and Apr. 24, 2018, respectively, the disclosures of which are hereby incorporated herein by reference in their entireties.

TECHNICAL FIELD

The present invention relates to an insulation member, a method of manufacturing the insulation member, and a method of manufacturing a cylindrical battery including the insulation member, and more particularly to an insulation member including an insulation plate substrate configured as a reticular structure formed by glass fiber strands and a binder applied to the insulation plate substrate, a method of manufacturing the insulation member, and a method of manufacturing a cylindrical battery comprising the insulation member.

BACKGROUND ART

Secondary batteries, which can be charged and discharged, have been widely used as energy sources for mobile devices. The secondary batteries also have attracted considerable attention as power sources for an electric vehicle (EV), a hybrid electric vehicle (HEV), and a plug-in hybrid electric vehicle (Plug-In HEV), which have been proposed as alternatives to gasoline and diesel vehicles. In addition, the secondary batteries are applicable in various fields, such as those of a power tool that requires high output, an electric bicycle (E-bike), an electric scooter (E-scooter), an electric golf cart, or a power storage system.

Based on the shape of a battery case, batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet. Among these batteries, the cylindrical battery has advantages in that the capacity of the cylindrical battery is large and in that the cylindrical battery is structurally stable.

An electrode assembly, which is mounted in a battery case, is a power-generating element configured to have a structure in which a positive electrode, a separator, and a negative electrode are stacked and configured so as to be capable of being charged and discharged. The electrode assembly is classified as a jelly-roll type electrode assembly, which is configured to have a structure in which a long sheet type positive electrode and a long sheet type negative electrode, to which active materials are applied, are wound in the state in which a separator is interposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are interposed respectively between the positive electrodes and the negative electrodes. The jelly-roll type electrode assembly has advantages in that it is possible to easily manufacture the jelly-roll type electrode assembly and in that the jelly-roll type electrode assembly has high energy density per unit weight.

FIG. 1 is a vertical sectional view schematically showing the upper end part of a conventional cylindrical battery.

Referring to FIG. 1, a cylindrical battery 10 is manufactured by placing a jelly-roll type (a wound type) electrode assembly 11 in a cylindrical can 13 in the state in which an insulation member 12 is mounted to the upper end of the electrode assembly 11, injecting an electrolytic solution into the cylindrical can 13, coupling a cap assembly 14, having an electrode terminal (e.g. a positive electrode terminal) (not shown) formed thereat, to the open upper end of the cylindrical can 13, and sealing the cap assembly 14.

The insulation member 12 is a plate-shaped member made of a material that exhibits electrical insulativity, such as polyethylene terephthalate (PET). The insulation member 12 is located between the electrode assembly 11 and the cap assembly 14 in order to prevent the occurrence of a short circuit due to contact between the cap assembly 14 and the cylindrical can 13.

In the case in which the interior temperature of the battery increases and exceeds 220° C., which is the melting point of PET, due to an abnormal situation, the insulation member made of PET may melt or shrink. Deformed PET cannot be properly wrapped around the electrode assembly 11. As a result, the cap assembly and the cylindrical can may come into contact with each other, which may cause the occurrence of a short circuit in the battery.

Meanwhile, Patent Document 1 discloses an insulation member for a secondary battery, wherein the insulation member includes insulators mounted at the upper end surface and the lower end surface of a jelly roll, the insulators being fastened to each other through a hollow center of the jelly roll to form an integrated structure in the process of manufacturing the battery, wherein the fastened portions of the insulators are located on the upper insulators or the lower insulators, and wherein the insulation member is made of polypropylene.

In addition, Patent Document 2 discloses an insulation member for a secondary battery, wherein the insulation member has a plate-shaped structure and is loaded on the upper end of a jelly roll disposed in a cylindrical battery case and wherein the insulation member includes polymer-resin or polymer-composite short fiber having therein micro-scale pores through which an electrolytic solution can pass but through which foreign matter having a size of 100 μm or more cannot pass.

However, the insulation member disclosed in each of Patent Document 1 and Patent Document 2 is made of only a polymer resin. For this reason, the insulation member has low heat resistance, and the flexibility of the insulation member is reduced when the insulation member is hardened. As a result, the insulation member cannot be easily stored, and the processability of the insulation member is reduced.

The number of fields in which cylindrical batteries are used has increased beyond expectation, and such cylindrical batteries have also come to be used in devices in which stability is prioritized, such as automobiles. Consequently, there is a need to develop an insulation member that is capable of guaranteeing the insulativity of an electrode assembly and a cap assembly while exhibiting high stability at a high temperature and excellent processability.

Korean Registered Patent No. 1154882
Korean Patent Application Publication No. 2013-0004075

DISCLOSURE

Technical Problem

The present invention has been made in view of the above problems, and it is an object of the present invention to provide an insulation member that exhibits high stability and insulativity at a high temperature, ease of storage, and excellent processability, a method of manufacturing the insulation member, and a method of manufacturing a cylindrical battery including the insulation member.

Technical Solution

In accordance with an aspect of the present invention, the above and other objects can be accomplished by the provision of an insulation member including a substrate configured as a plate-shaped reticular structure having apertures formed therein by a plurality of crossed glass fiber strands and a binder coated on the outer surface of each of the glass fiber strands.

The binder may be a silicone-based compound or a urethane-based compound.

Also, in the insulation member according to the present invention, the apertures formed in the substrate may be further filled with a binder, and the thickness of the layer of the binder that fills the apertures may be larger than the thickness of the substrate.

Also, in the insulation member according to the present invention, the binder filling the apertures formed in the substrate and the binder coated on the outer surface of each of the glass fiber strands may be made of the same material. Alternatively, the binder filling the apertures formed in the substrate and the binder coated on the outer surface of each of the glass fiber strands may be made of different materials, as needed.

In accordance with another aspect of the present invention, there is provided a method of manufacturing an insulation member comprising a first step of crossing a plurality of glass fiber strands in the form of a lattice in order to prepare a substrate configured as a plate-shaped reticular structure having apertures formed therein, a second step of spraying a binder on the substrate in order to coat the outer surface of each of the glass fiber strands, a third step of drying and hardening the substrate, on which the binder has been sprayed, and a fourth step of cutting the substrate into a predetermined shape in order to obtain an insulation member.

In accordance with another aspect of the present invention, there is provided a method of manufacturing an insulation member comprising a first step of crossing a plurality of glass fiber strands in the form of a lattice in order to prepare a substrate configured as a plate-shaped reticular structure having apertures formed therein, a second step of filling the apertures formed in the substrate with a binder, a third step of drying and hardening the substrate, which has been filled with the binder, and a fourth step of cutting the substrate into a predetermined shape in order to obtain an insulation member.

The binder may be a silicone-based compound or a urethane-based compound.

In accordance with another aspect of the present invention, there is provided a method of manufacturing an insulation member comprising a first step of crossing a plurality of glass fiber strands in the form of a lattice in order to prepare a substrate configured as a plate-shaped reticular structure having apertures formed therein, a second step of spraying a binder on the substrate in order to coat the outer surface of each of the glass fiber strands, a third step of drying and hardening the substrate, on which the binder has been sprayed, a fourth step of filling the apertures formed in the substrate with a binder, a fifth step of drying and hardening the substrate, which has been filled with the binder, and a sixth step of cutting the substrate into a predetermined shape in order to obtain an insulation member, wherein the binder coated on the outer surface of each of the glass fiber strands and the binder filling the apertures formed in the substrate are different from each other.

The binder coated on the outer surface of each of the glass fiber strands may be a silicone-based compound, and the binder filling the apertures formed in the substrate may be a urethane-based compound. The substrate may be cut by punching.

In accordance with another aspect of the present invention, there is provided a method of manufacturing a cylindrical battery comprising a step of preparing an insulation member, a step of cutting the insulation member into a circular shape, a step of placing an electrode assembly in a cylindrical can, a step of locating the insulation member at the upper part of the electrode assembly, a step of coupling a cap assembly to the upper part of the insulation member, and a step of sealing the cap assembly.

In accordance with another aspect of the present invention, there is provided a cylindrical battery comprising a cylindrical can, an electrode assembly placed in the cylindrical can, an insulation member located at the upper part of the electrode assembly, and a cap assembly located at the upper part of the insulation member, wherein the insulation member is configured such that a substrate configured as a plate-shaped reticular structure having apertures formed therein by a plurality of crossed glass fiber strands is filled with a silicone-based compound.

BRIEF DESCRIPTION OF DRAWINGS

FIG. 1 is a vertical sectional view showing the upper end part of a conventional cylindrical battery.

FIG. 2 is a flowchart showing a method of manufacturing an insulation member according to a first embodiment of the present invention.

FIG. 3 is a flowchart showing a method of manufacturing an insulation member according to a second embodiment of the present invention.

FIG. 4 is a schematic view showing an insulation member manufactured using the manufacturing method according to the first embodiment or the second embodiment of the present invention.

FIG. 5 is a flowchart showing a method of manufacturing an insulation member according to a third embodiment of the present invention.

FIG. 6 is a flowchart showing a method of manufacturing an insulation member according to a fourth embodiment of the present invention.

FIG. 7 is a schematic view showing an insulation member manufactured using the manufacturing method according to the third embodiment or the fourth embodiment of the present invention.

FIG. 8 is a flowchart showing a method of manufacturing an insulation member according to a fifth embodiment of the present invention.

FIG. 9 is a schematic view showing an insulation member manufactured using the manufacturing method according to the fifth embodiment of the present invention.

FIG. 10 is a schematic view showing an insulation member manufactured using a manufacturing method according to a modification of the fifth embodiment of the present invention.

FIG. 11(*a*) is a photograph showing micro-scale fragment particles generated at the time of processing the insulation member manufactured using the manufacturing method according to the third embodiment of the present invention, and FIG. 11(*b*) is a photograph showing micro-scale fragment particles generated at the time of processing an insulation member manufactured using a conventional manufacturing method.

FIG. 12(*a*) is a photograph showing the result of an explosion test performed on the insulation member manufactured using the manufacturing method according to the third embodiment of the present invention, and FIG. 12(*b*) is a photograph showing the result of an explosion test performed on the insulation member manufactured using the conventional manufacturing method.

FIG. 13 is a conceptual view showing the deformed state of the insulation member manufactured using the manufacturing method according to the second embodiment or the fourth embodiment of the present invention when the insulation member absorbs an electrolytic solution.

FIG. 14 is a conceptual view showing the deformed state of the insulation member manufactured using the manufacturing method according to the fifth embodiment of the present invention when the insulation member absorbs an electrolytic solution.

FIG. 15 is a conceptual view showing the deformed state of the insulation member manufactured using the manufacturing method according to the modification of the fifth embodiment of the present invention when the insulation member absorbs an electrolytic solution.

BEST MODE

In the present application, it should be understood that the terms "comprises," "has," or "includes," etc. specify the presence of features, integers, steps, operations, components, parts, or combinations thereof described in the specification, but do not preclude the presence or addition of one or more other features, integers, steps, operations, components, parts, or combinations thereof.

Wherever possible, the same reference numbers will be used throughout the drawings to refer to parts that perform similar functions or operations. Meanwhile, in the case in which one part is 'connected' to another part throughout the specification, not only may the one part be directly connected to the another part, but also, the one part may be indirectly connected to the another part via a further part. In addition, that a certain element is 'included' means that other elements are not excluded, but may be further included unless mentioned otherwise.

An insulation member according to the present invention includes a substrate configured as a reticular structure having apertures formed therein by a plurality of crossed glass fiber strands and a binder that is coated on the outer surface of each of the glass fiber strands, fills the apertures, or forms a thin film on the upper surface and the lower surface of the substrate.

In the present invention, the substrate configured as the reticular structure includes a plurality of glass fiber strands having a very high melting point (glass transition temperature). When the temperature of a battery increases due to repeated charging and discharging of the battery or when the temperature of the battery abruptly increases in an abnormal state of the battery due to the occurrence of a short circuit in the battery or an external impact applied to the battery, therefore, the insulation member does not melt or shrink due to such a high temperature, whereby it is possible to prevent contact between an electrode assembly and a cap assembly. As a result, it is possible to guarantee the insulativity of the interior of the battery even at a high temperature.

In general, glass fiber is a glass material that is formed so as to be thin as fiber. Such glass fiber is also called fiberglass. The glass fiber is made from raw materials such as silica, limestone, and borax. The glass fiber is classified as A-glass, C-glass, E-glass, or S-glass depending on the combination of the raw materials. A-glass, which is high-alkaline glass, exhibits high resistance to chemical materials but low electrical properties. E-glass exhibits high electrical insulativity, and S-glass exhibits high tensile strength. In the case in which special resistance to chemical materials is required, C-glass is used.

A-glass, C-glass, E-glass, and S-glass may all be used as the substrate material of the present invention. C-glass, which exhibits high chemical resistance, or E-glass, which exhibits high electrical insulativity, may be preferably used.

The glass fiber has a melting point of 500° C. to 1500° C., preferably 500° C. to 1200° C. In the case in which the melting point of the glass fiber is less than 500° C., the glass fiber exhibits low resistance to the high temperatures occurring due to repeated charging and discharging of the battery. As a result, the insulation member may melt, whereby it is not possible to guarantee the insulativity of the interior of the battery. In the case in which the melting point of the glass fiber is greater than 1500° C., on the other hand, the amount of energy necessary to perform the process of manufacturing the glass fiber is increased, with the result that the processability of the insulation member is reduced. Ultimately, the cost of the insulation member is increased. For these reasons, it is preferable for the melting point of the glass fiber to be within the above-specified range.

The binder, which is coated on the glass fiber strands, fills the apertures, or forms the thin film, may be selected from the group consisting of a silicone resin, an epoxy resin, and a urethane resin. The silicone resin and/or the urethane resin may be preferably used.

In a conventional cylindrical battery, in some cases, a phenol resin and glass fiber are used as an insulation member for preventing contact between an electrode assembly and a cap assembly in order to guarantee the insulativity of the battery. In the case in which the glass fiber is impregnated with the phenol resin in order to manufacture the insulation member, the strength of the insulation member is increased. As a result, the insulation member is not bent or folded, and therefore it is possible to prevent deformation of the electrode assembly.

In the case in which the glass fiber is impregnated with the phenol resin in order to manufacture the insulation member, as described above, however, the hardness of the insulation member is excessively increased, i.e. the insulation member is too rigid. As a result, it is difficult to store the insulation member in the state of being wound in the form of a roll. Particularly, at the step of processing the insulation member to cut the insulation member to a desired size, a large amount of micro-scale fragments are generated from the insulation member. As a result, there is a high risk of a short circuit occurring in the battery due to contamination of the electrode assembly in the battery cell and due to damage to separators in electrodes, which has been noted repeatedly.

In contrast, in the case in which a silicone resin is applied to a substrate configured as a reticular structure formed by a plurality of crossed glass fiber strands, after which the silicone resin is dried, it is possible to guarantee the desired flexibility of the insulation member. Consequently, is possible to wind the insulation member in the form of a roll, and therefore it is possible to easily store and transport the insulation member. In addition, few micro-scale fragments are generated in the punching process due to the flexibility of the insulation member, whereby it is possible to maximally prevent a risk of a short circuit occurring in the battery due to contamination of the electrode assembly and due to damage to the separators in the electrodes. In addition, it is possible to guarantee excellent insulativity of the battery, and the adhesion between the silicone resin and the glass fiber strands is excellent.

The binder is not particularly restricted, as long as the binder includes silicone as a main component. For example, silicon rubber may be used as the binder.

The content of the silicone resin according to the present invention is 10 to 50 weight percent, preferably 20 to 40 weight percent, and more preferably 25 to 35 weight percent, based on 100 weight percent of the reticular-structured substrate. In the case in which the content of the silicone resin is less than 10 weight percent, a large amount of micro-scale fragments are generated in the punching process, and the force for holding the glass fiber strands and the force of adhesion to the glass fiber strands are sharply reduced. In the case in which the content of the silicone resin is greater than 50 weight percent, on the other hand, the overall thickness of the insulation member is increased. For these reasons, it is preferable for the content of the silicone resin to be within the above-specified range.

Meanwhile, a urethane resin may be used as the binder. In the case in which a urethane resin is applied to a substrate configured as a reticular structure formed by a plurality of crossed glass fiber strands and in which the urethane resin is then dried so as to be used as an insulation member, the urethane resin absorbs an electrolytic solution, with the result that the urethane resin expands to a desired volume. Consequently, the size of the insulation member becomes larger than the horizontal sectional size or the vertical sectional size of a cylindrical can reception unit. The insulation member may be deformed while being crumpled laterally in proportion to the increased volume thereof, or may expand in the vertical direction in proportion to the increased volume thereof. The deformed structure of the insulation member may assuredly increase the distance between the electrode assembly and the cap assembly, whereby it is possible to further guarantee the insulativity of the battery.

A method of manufacturing a cylindrical battery using the insulation member prepared as described above may include a step of cutting the insulation member into a circular shape, a step of placing an electrode assembly in a cylindrical can, a step of locating the insulation member at the upper part of the electrode assembly, a step of coupling a cap assembly to the upper part of the insulation member, and a step of sealing the cap assembly.

Meanwhile, the kind of battery according to the present invention is not particularly restricted. For example, the battery may be a lithium battery, such as a lithium ion (Li-ion) battery, a lithium polymer (Li-polymer) battery, or a lithium ion polymer (Li-ion polymer) battery, which exhibits high energy density, discharge voltage, and output stability.

In general, a lithium battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and/or a positive electrode current collecting extension and drying the mixture. A filler may be further added to the mixture as needed.

In general, the positive electrode current collector and/or the positive electrode current collecting extension is manufactured so as to have a thickness of 3 to 500 µm. The positive electrode current collector and/or the positive electrode current collecting extension is not particularly restricted, as long as the positive electrode current collector and/or the positive electrode current collecting extension exhibits high conductivity while the positive electrode current collector and/or the positive electrode current collecting extension does not induce any chemical change in a battery to which the positive electrode current collector and/or the positive electrode current collecting extension is applied. For example, the positive electrode current collector and/or the positive electrode current collecting extension may be made of stainless steel, aluminum, nickel, titanium, or plastic carbon. Alternatively, the positive electrode current collector and/or the positive electrode current collecting extension may be made of aluminum or stainless steel, the surface of which is treated with carbon, nickel, titanium, or silver. The positive electrode current collector and/or the positive electrode current collecting extension may have a micro-scale uneven pattern formed on the surface thereof so as to increase the force of adhesion of the positive electrode active material. The positive electrode current collector and/or the positive electrode current collecting extension may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode active material to a negative electrode current collector and/or a negative electrode current collecting extension and drying the same. The above-described components may be selectively further included as needed.

In general, the negative electrode current collector and/or the negative electrode current collecting extension is manufactured so as to have a thickness of 3 to 500 μm. The negative electrode current collector and/or the negative electrode current collecting extension is not particularly restricted, so long as the negative electrode current collector and/or the negative electrode current collecting extension exhibits high conductivity while the negative electrode current collector and/or the negative electrode current collecting extension does not induce any chemical change in a battery to which the negative electrode current collector and/or the negative electrode current collecting extension is applied. For example, the negative electrode current collector and/or the negative electrode current collecting extension may be made of copper, stainless steel, aluminum, nickel, titanium, or plastic carbon. Alternatively, the negative electrode current collector and/or the negative electrode current collecting extension may be made of copper or stainless steel, the surface of which is treated with carbon, nickel, titanium, or silver, or an aluminum-cadmium alloy. In addition, the negative electrode current collector and/or the negative electrode current collecting extension may have a micro-scale uneven pattern formed on the surface thereof so as to increase the force of adhesion of the negative electrode active material, in the same manner as the positive electrode current collector and/or the positive electrode current collecting extension. The negative electrode current collector and/or the negative electrode current collecting extension may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 < x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film that exhibits high ion permeability and mechanical strength is used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The electrolytic solution may be a non-aqueous electrolytic solution containing lithium salt, which is composed of a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$. $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas. Moreover, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of a cyclic carbonate, such as EC or PC, which is a high dielectric solvent, and a linear carbonate, such as DEC, DMC, or EMC, which is a low viscosity solvent, in order to prepare a non-aqueous electrolyte containing lithium salt.

Hereinafter, exemplary embodiments will be presented in order to help understanding of the present invention. It should be noted, however, that the following embodiments are given for easier understanding of the present invention, and thus the scope of the present invention is not limited by the embodiments.

Embodiment 1

FIG. 2 is a flowchart showing a method of manufacturing an insulation member according to a first embodiment of the present invention. The method of manufacturing the insulation member according to the first embodiment of the present invention includes a step of crossing a plurality of glass fiber strands in the form of a lattice in order to prepare a substrate configured as a plate-shaped reticular structure having apertures formed therein, a step of spraying a binder on the substrate in order to coat the outer surface of each of the glass fiber strands, a step of drying the substrate, on which the binder has been sprayed, and a step of cutting the substrate into a predetermined shape in order to obtain an insulation member.

Here, silicone rubber is used as the binder. As shown in FIG. 4, a finally manufactured insulation member 100 is configured such that the outer surface of each of a plurality of glass fiber strands 110 is coated with silicone rubber, as a binder 120, and such that micro-scale pores, each of which has a predetermined size, are formed between the glass fiber strands.

In the case in which the micro-scale pores are formed in the insulation member 100, as described above, it is possible to prevent unexpected explosion of a battery. That is, in the case in which gas, such as carbon dioxide or carbon monoxide, is generated in a secondary battery due to various causes occurring in the secondary battery, such as repeated charging and discharging of the secondary battery, overcharging of the secondary battery, or a short circuit occurring in the secondary battery, the volume of a battery case of the secondary battery is increased, i.e. the battery case of the secondary battery swells. Since a plurality of micro-scale pores is formed in the insulation member 100 according to the present invention, however, such gas may move to a cap assembly through the pores, whereby it is possible to reduce the risk of explosion of the secondary battery.

Meanwhile, it is possible to coat the outer surface of each of the glass fiber strands and to form the micro-scale pores between the glass fiber strands using a conventional method. For example, silicone rubber may be sprayed on the glass fiber strands using a sprayer, and air may be injected to the glass fiber strands at a predetermined level of pressure after a predetermined amount of time in order to remove the silicone rubber from the interconnections between the glass fiber strands, which have relatively low force of coupling with the silicone rubber, or to form the micro-scale pores between the glass fiber strands.

Embodiment 2

FIG. 3 is a flowchart showing a method of manufacturing an insulation member according to a second embodiment of the present invention. The method of manufacturing the insulation member according to the second embodiment of the present invention includes a step of crossing a plurality of glass fiber strands in the form of a lattice in order to prepare a substrate configured as a plate-shaped reticular structure having apertures formed therein, a step of spraying urethane resin, as a binder, on the substrate in order to coat the outer surface of each of the glass fiber strands, a step of drying the substrate, on which the urethane resin has been sprayed, and a step of cutting the substrate into a predetermined shape in order to obtain an insulation member.

Embodiment 2 is identical to Embodiment 1 except that silicone rubber is used as the binder in Embodiment 1, whereas urethane resin is used as the binder in Embodiment 2. As shown in FIG. 4, a finally manufactured insulation member 100 is configured such that the outer surface of each of a plurality of glass fiber strands 110 is coated with urethane resin, as a binder 120, and such that micro-scale pores, each of which has a predetermined size, are formed between the glass fiber strands in the same manner.

Embodiment 3

FIG. 5 is a flowchart showing a method of manufacturing an insulation member according to a third embodiment of the present invention. The method of manufacturing the insulation member according to the third embodiment of the present invention includes a step of crossing a plurality of glass fiber strands in the form of a lattice in order to prepare a substrate configured as a plate-shaped reticular structure having apertures formed therein, a second step of filling the apertures formed in the substrate with silicone rubber, as a binder, a third step of drying and hardening the substrate, which has been filled with the silicone rubber, and a fourth step of cutting the substrate into a predetermined shape in order to obtain an insulation member. The insulation member manufactured using this manufacturing method is schematically shown in FIG. 7.

As shown in FIG. 7, apertures 130, which are formed between glass fiber strands 110, are filled with silicone rubber, as a binder 120, in order to guarantee the flexibility of the insulation member. Consequently, it is possible to easily store the insulation member and to maximally prevent the generation of micro-scale fragments at the time of punching the insulation member.

Here, the case in which the apertures 130, which are formed between the glass fiber strands 110, are filled with the silicone rubber includes the case in which a film having a predetermined thickness is formed on the upper surface and/or the lower surface of the substrate as well as the case in which only the apertures 130 are filled with the silicone rubber.

Embodiment 4

FIG. 6 is a flowchart showing a method of manufacturing an insulation member according to a fourth embodiment of the present invention. The method of manufacturing the insulation member according to the fourth embodiment of the present invention includes a step of crossing a plurality of glass fiber strands in the form of a lattice in order to prepare a substrate configured as a plate-shaped reticular structure having apertures formed therein, a step of filling the apertures formed in the substrate with urethane resin, as a binder, a step of drying the substrate, which has been filled with the urethane resin, and a step of cutting the substrate into a predetermined shape in order to obtain an insulation member.

Embodiment 4 is identical to Embodiment 3 except that silicone rubber is used as the binder in Embodiment 3, whereas urethane resin is used as the binder in Embodiment 4. As shown in FIG. 7, a finally manufactured insulation member 100 is configured such that urethane resin, as a binder 120, is disposed between glass fiber strands 110 in the same manner.

Embodiment 5

FIG. 8 is a flowchart showing a method of manufacturing an insulation member according to a fifth embodiment of the present invention. The method of manufacturing the insulation member according to the fifth embodiment of the present invention includes a step of crossing a plurality of glass fiber strands in the form of a lattice in order to prepare a substrate configured as a plate-shaped reticular structure having apertures formed therein, a step of spraying silicone rubber, as a binder, on the substrate in order to coat the outer surface of each of the glass fiber strands, a step of drying the substrate, on which the silicone rubber has been sprayed, a step of filling the apertures formed in the substrate with urethane resin, a step of drying and hardening the substrate, which has been filled with the urethane resin, and a step of cutting the substrate into a predetermined shape in order to obtain an insulation member.

As shown in FIG. 9, which is a schematic view showing an insulation member manufactured using the manufacturing method according to the fifth embodiment of the present invention, the outer surface of each of a plurality of glass fiber strands 110 is coated with silicone rubber 121, and apertures 130 are filled with urethane resin.

Meanwhile, FIG. 9(a) is a schematic view showing the case in which no film is formed on the upper surface or on the lower surface of the substrate using the urethane resin, and FIG. 9(b) is a schematic view showing the case in which a film may be formed on the upper surface and on the lower surface of the substrate using the urethane resin.

The insulation member manufactured using the manufacturing method according to the fifth embodiment of the present invention, as described above, has advantages in that the flexibility of the insulation member is guaranteed due to the silicone rubber and in that the volume of the urethane resin can be increased.

FIG. 10 is a schematic view showing an insulation member manufactured using a manufacturing method according to a modification of the fifth embodiment of the present invention. As shown in FIG. 10, the diameters of glass fiber strands 110 located at the edge of the insulation member are smaller than the diameters of glass fiber strands 110 located at the middle of the insulation member; that is, the thickness of the manufactured insulation member may not be uniform. Alternatively, the insulation member may be manufactured such that the glass fiber strands 110 have the same diameter but different amounts of urethane resin 122 are applied to the upper surface and the lower surface of the substrate.

Experimental Example 1

In order to check the ease of storage or transportation of the insulation member manufactured according to the present invention, the tensile strength of the insulation member manufactured using the manufacturing method according to Embodiment 3, in which the substrate having the plate-shaped reticular structure formed by the glass fiber strands is filled with the silicone rubber, was measured.

As Comparative Example 1, an insulation member was manufactured from a substrate including a plate-shaped reticular structure formed by glass fiber strands using the same method as Embodiment 3 except that phenol resin was used instead of the silicone rubber.

The insulation members were cut in order to prepare test samples having a horizontal size of 2 cm and a vertical size of 8.5 cm, and the tensile strength of the test samples was measured at a measurement speed of 100 mm/min using a universal testing machine (UTM).

TABLE 1

| | Tensile strength (N/mm$^2$) |
|---|---|
| Insulation member according to the present invention | 81.8 |
| Insulation member according to Comparative Example 1 | Not measurable (1000 or more) |

As can be seen from the results shown in Table 1, the tensile strength of the insulation member manufactured according to the present invention was 81.8 N/mm$^2$, and therefore the insulation member could be easily bent so as to be stored in the form of a roll. Since the insulation member manufactured using the phenol resin according to Comparative Example 1 had very high tensile strength, which is not measurable, however, it can be seen that the insulation member manufactured according to Comparative Example 1 could not be bent, and therefore the insulation member could not be stored in the form of a roll.

Experimental Example 2

In order to check the processability of the insulation member manufactured according to the present invention, the insulation member manufactured using the manufacturing method according to Embodiment 3, in which the substrate having the plate-shaped reticular structure formed by the glass fiber strands is filled with the silicone rubber, was cut to investigate the generation of micro-scale fragment particles.

As Comparative Example 2, an insulation member, manufactured from a substrate including a plate-shaped reticular structure formed by glass fiber strands using the same method as Embodiment 3 except that phenol resin was used instead of the silicone rubber, was cut using the same method.

FIG. 11(a) is a photograph showing micro-scale fragment particles generated at the time of cutting the insulation member manufactured according to the present invention, and FIG. 11(b) is a photograph showing micro-scale fragment particles generated at the time of cutting the insulation member manufactured according to the comparative example. As can be seen from the results shown in FIG. 11, no micro-scale fragment particles generated from the insulation member manufactured according to the present invention were observed. However, it can be seen that a large amount of micro-scale fragment particles were generated from the insulation member manufactured according to Comparative Example 2. As a result, it is possible to expect that there is high risk of elements constituting a battery, such as an electrode assembly, being contaminated.

Experimental Example 3

In order to check the heat resistance of the insulation member manufactured according to the present invention, TGA of the insulation member manufactured using the manufacturing method according to Embodiment 3, in which the substrate having the plate-shaped reticular structure formed by the glass fiber strands is filled with the silicone rubber, was analyzed.

As Comparative Example 3-1, TGA of an insulation member, manufactured from a substrate including a plate-shaped reticular structure formed by glass fiber strands using the same method as Embodiment 3 except that phenol resin was used instead of the silicone rubber, was analyzed. As Comparative Example 3-2, TGA of an insulation plate substrate made of polyethylene terephthalate (PET) was also analyzed.

TABLE 2

|  | Experimental Example 3 | Comparative Example 3-1 | Comparative Example 3-2 |
|---|---|---|---|
| TGA thermal decomposition level (based on heating at 950° C.) | 13.4% mass loss | 40.5% mass loss | 100% mass loss |

As can be seen from Table 2, the result of TGA analysis on the insulation member according to the present invention reveals that the insulation member had a mass loss of 13.4%. However, it can be seen that the mass loss of the insulation member according to Comparative Example 3-1, in which the phenol resin was applied instead of the silicone rubber, was 40.5%, which is more than three times that of the insulation member according to the present invention. In addition, it can be seen that the insulation member according to Comparative Example 3-2, i.e. the PET insulation plate substrate, was completely burned.

That is, it is possible to confirm that, in the case in which silicone rubber is filled in and/or applied to a substrate formed of glass fiber, as in the present invention, the heat resistance of the substrate is considerably improved.

FIG. 12(a) is a photograph showing the result of an explosion test performed on the insulation member according to the present invention (Experimental Example 3), and FIG. 12(b) is a photograph showing the result of an explosion test performed on the insulation member according to Comparative Example 3-2. In the explosion test, a cell was exploded in the state in which the cell was placed in a furnace at a temperature of 600° C. in order to check whether a safety device of a cylindrical battery operates stably.

The results shown in FIG. 12 reveal that, in the case in which a battery was exploded in the state in which the insulation member was mounted to the upper end of a cylindrical can, PET non-woven fabric was completely burned down, and therefore it was difficult to check the shape of the insulation member, whereas the shape of the insulation member according to the present invention was maintained, and therefore the insulativity of a battery was maintained when the battery was exploded.

Experimental Example 4

In the case in which the insulation member, obtained by coating the glass fiber strands of the substrate having the plate-shaped reticular structure formed by the glass fiber strands with the urethane resin or filling the apertures formed between the glass fiber strands with the urethane resin (see Embodiment 2, Embodiment 4, FIG. 4, and FIG. 7), comes into contact with an electrolytic solution, the external shape of the insulation member may be deformed.

As shown in FIG. 13, the urethane resin included in the insulation member tends to expand at the time of coming into contact with the electrolytic solution, with the result that the size of the insulation member becomes larger than the horizontal sectional size of a cylindrical can reception unit. The insulation member may be deformed while being crumpled in proportion to the increased area thereof. The deformed structure of the insulation member may increase the distance between an electrode assembly and a cap assembly, whereby it is possible to further guarantee the insulativity of a battery.

When coming into contact with the electrolytic solution, the insulation member may expand within a range of 100% to 150% of the original length thereof. In the case in which the expanded length of the insulation member is less than 100% of the original length thereof, the insulation member cannot wrap a portion of the interior of the battery when the insulation member shrinks at a high temperature, with the result that it is difficult to achieve intended effects. In the case in which the expanded length of the insulation member is greater than 150% of the original length thereof, on the other hand, the insulation member may not be received in the space defined between the electrode assembly and the cap assembly due to excessive length of the insulation member. As a result, the insulation member may be twisted or may be cut by shear force. For these reasons, it is preferable for the insulation member to expand within the above-specified range.

Experimental Example 5

In the case in which the insulation member, obtained by coating the glass fiber strands of the substrate having the plate-shaped reticular structure formed by the glass fiber strands with the silicone rubber and filling the apertures formed between the glass fiber strands with the urethane resin (see Embodiment 5 and FIG. 9), comes into contact with an electrolytic solution, the external shape of the insulation member may be deformed mainly at the portions of the insulation member at which the urethane resin is located.

As shown in FIG. 14, the silicone rubber included in the insulation member does not expand even when coming into contact with the electrolytic solution, whereas the urethane resin included in the insulation member tends to expand at the time of coming into contact with the electrolytic solution, with the result that the insulation member expands in the vertical direction of a cylindrical can reception unit. The insulation member may increase the distance between an electrode assembly and a cap assembly in proportion to the increased volume thereof, whereby it is possible to further guarantee the insulativity of a battery. Furthermore, the ease of storage and the processability of the insulation member are excellent due to the flexibility of the silicon resin.

Experimental Example 6

In the case in which the insulation member, obtained by coating the glass fiber strands of the substrate having the plate-shaped reticular structure formed by the glass fiber strands with the silicone rubber and filling the apertures formed between the glass fiber strands with the urethane resin and configured so as to have different thicknesses (see the modification of Embodiment 5 and FIG. 10), comes into contact with an electrolytic solution, the external shape of the insulation member may be deformed mainly at the portions of the insulation member at which the urethane resin is located, in a manner similar to Embodiment 5.

As shown in FIG. 15, the silicone rubber included in the insulation member does not expand even when coming into contact with the electrolytic solution, whereas the urethane resin included in the insulation member tends to expand at the time of coming into contact with the electrolytic solution, with the result that the insulation member expands in the vertical direction of a cylindrical can reception unit. Particularly, since the thickness of the insulation member at the middle thereof is greater than the thickness of the insulation member at the edge thereof, the insulation member may expand into a space defined between an electrode assembly and a cap assembly, whereby it is possible to improve the impact resistance of a battery.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it is obvious that such changes and modifications fall within the appended claims.

100: Insulation member
110: Glass fiber strands
120: Binder
121: Silicone rubber 122: Urethane resin
130: Apertures
200: Cylindrical battery
210: Electrode assembly
220: Cylindrical can
230: Cap assembly

INDUSTRIAL APPLICABILITY

According to the present invention, it is possible to provide an insulation member made of glass fiber having a high melting point. When the temperature of a battery increases, therefore, the insulation member does not melt or shrink due to a high temperature, whereby it is possible to guarantee stable insulativity of the battery even at high temperatures.

In addition, the hardness of an insulation member to which a binder including silicone is applied is not increased, whereby it is possible to store or transport the insulation member in the state of being wound in the form of a roll. Furthermore, no powder is generated from the insulation member at the time of cutting the insulation member, whereby it is possible to minimize the amount of impurities generated at the step of manufacturing the insulation member.

The invention claimed is:

1. A cylindrical secondary battery comprising:
a cylindrical can;
an electrode assembly placed in the cylindrical can;
an insulation member mounted directly to an upper part of the electrode assembly; and
a cap assembly located at an upper part of the insulation member, such that the insulation member is located between the electrode assembly and the cap assembly,
wherein the insulation member comprises a plate-shaped reticular structure having apertures formed therein by a plurality of crossed glass fiber strands and a binder coated on an outer surface of each of the glass fiber strands,
wherein the binder is a first binder, and the apertures are filled with a second binder, and
wherein the first binder is a silicone-based compound and the second binder is a urethane-based compound.

2. The cylindrical secondary battery according to claim 1, wherein the binder is a silicone-based compound or a urethane-based compound.

3. The cylindrical secondary battery according to claim 1, wherein a thickness of a layer of the second binder is larger than a thickness of the reticular structure.

4. The cylindrical secondary battery according to claim 1, wherein a greater amount of the second binder is applied in a central region of the insulation member, such that a first thickness of the insulation member at a peripheral edge thereof is smaller than a second thickness of the insulation member in the central region, the first and second thicknesses being defined in a direction perpendicular to a planar surface of the reticular structure.

5. The cylindrical secondary battery according to claim 3, wherein the second binder extends out of the apertures and forms a film overlying at least one of an upper planar surface of the reticular structure and a lower planar surface of the reticular structure opposite the upper planar surface.

6. The cylindrical secondary battery according to claim 1, wherein the first binder and the second binder together form a unitary binder region that coats the glass fiber strands and fills the apertures between the glass fiber strands.

7. A cylindrical secondary battery comprising:
a cylindrical can;
an electrode assembly placed in the cylindrical can;
an insulation member mounted directly to an upper part of the electrode assembly; and
a cap assembly located at an upper part of the insulation member, such that the insulation member is located between the electrode assembly and the cap assembly,
wherein the insulation member comprises a plate-shaped reticular structure having apertures formed therein by a plurality of crossed glass fiber strands and a binder coated on an outer surface of each of the glass fiber strands,
wherein the binder is a first binder, and the apertures are filled with a second binder,
wherein the first binder is a silicone-based compound and the second binder is a urethane-based compound, and
wherein first diameters of a first group of the glass fiber strands disposed at a peripheral edge of the insulation member are smaller than second diameters of a second group of the glass fiber strands disposed within a central region of the insulation member.

8. The cylindrical secondary battery according to claim 7, wherein a first thickness of the insulation member at the peripheral edge is smaller than a second thickness of the insulation member in the central region, the first and second thicknesses being defined in a direction perpendicular to a planar surface of the reticular structure.

* * * * *